(12) United States Patent  
Michaeli et al.

(10) Patent No.: US 8,769,119 B2  
(45) Date of Patent: Jul. 1, 2014

(54) METHOD AND APPARATUS FOR PUSHING APPLICATIONS TO A WEBSITE VISITOR DURING CO-BROWSING

(71) Applicant: SaleMove, Inc., New York, NY (US)

(72) Inventors: Daniel Michaeli, New York, NY (US); Justin DiPietro, New York, NY (US); Carlos Paniagua, New York, NY (US); David Rodas, New York, NY (US)

(73) Assignee: Salemove, Inc., New York, NY (US)

( * ) Notice: Subject to any disclaimer, the term of this patent is extended or adjusted under 35 U.S.C. 154(b) by 0 days.

(21) Appl. No.: 14/073,688

(22) Filed: Nov. 6, 2013

(65) Prior Publication Data

US 2014/0129622 A1     May 8, 2014

Related U.S. Application Data

(60) Provisional application No. 61/722,853, filed on Nov. 6, 2012.

(51) Int. Cl.
    *G06F 15/16*      (2006.01)
    *G06F 12/00*      (2006.01)

(52) U.S. Cl.
    USPC .......................................... 709/227; 717/172

(58) Field of Classification Search
    CPC ....... G06F 21/00; G06F 17/241; G06F 21/31; G06F 21/44; G06F 3/0484; G06F 11/1448; G06F 11/1464; G06F 15/173; G06F 15/17356; G06F 17/212; G06F 17/30014; G06F 17/30165; G06F 17/30289; G06F 17/303
    USPC ................ 709/203, 206–207, 223–229, 250; 717/168–173
    See application file for complete search history.

(56) References Cited

U.S. PATENT DOCUMENTS

| | | | |
|---|---|---|---|
| 6,145,001 A * | 11/2000 | Scholl et al. .................. | 709/223 |
| 6,263,365 B1 * | 7/2001 | Scherpbier .................... | 709/218 |
| 2013/0159412 A1 * | 6/2013 | Robinson et al. ............. | 709/204 |
| 2014/0019870 A1 * | 1/2014 | Paniagua et al. .............. | 715/738 |
| 2014/0019888 A1 * | 1/2014 | Paniagua et al. .............. | 715/760 |

* cited by examiner

*Primary Examiner* — Zarni Maung
(74) *Attorney, Agent, or Firm* — Volpe and Koenig, P.C.

(57) ABSTRACT

Apparatuses, computer readable mediums, and methods for pushing applications to a website visitor during co-browsing are disclosed. The method may include initiating a co-browsing session between an operator and a visitor. The method may include selecting an application to push to the visitor. The method may include configuring the application, and pushing the application to the visitor. The method may include co-browsing the application with the visitor. The configuring may include configuring the application by selecting content from webservers over the Internet. The content from the webservers may be received through a content provider layer.

16 Claims, 16 Drawing Sheets

METHOD AND APPARATUS FOR PUSHING APPLICATIONS TO A WEBSITE VISITOR DURING CO-BROWSING

CROSS REFERENCE TO RELATED APPLICATIONS

This application claims the benefit of U.S. Patent Application No. 61/722,853, filed on Nov. 6, 2012 the entire contents of which is herein incorporated by reference.

TECHNICAL FIELD

The disclosed embodiments are generally directed to methods and apparatuses for pushing applications to a website visitor, and in particular, to methods and apparatuses for pushing applications to a website visitor during co-browsing.

BACKGROUND

Often, a visitor to a custom website needs assistance. For example, often a visitor to a custom website that offers products for sale needs help in a similar way as a visitor to a brick and mortar store needs assistance. One way to assist the visitor is to permit an operator of the website to co-browse the website with the visitor. However, often co-browsing solutions do not provide a pleasant visitor experience, and often do not result in a sale to the visitor. The operator is often not able to provide the visitor with all the services the visitor would like to make a purchase decision.

Therefore, there is a need in the art for an apparatus, computer readable medium, and method for pushing an application to a website visitor during co-browsing.

SUMMARY OF EMBODIMENTS

Some disclosed embodiments provide a method for pushing applications to a website visitor during co-browsing. The method may include initiating a co-browsing session between an operator and a visitor. The method may include selecting an application to push to the visitor. The method may include configuring the application. The method may include pushing the application to the visitor. The method may include co-browsing the application with the visitor.

Configuring the application may include selecting content from webservers over the Internet. The content from the webservers may be received from a content provider layer.

The application may be configured to provide the visitor with at least one from the following group: the ability to upload a photograph, the ability to record the co-browsing session, and the ability to invite a friend to join the co-browsing session.

The method may further include selecting to silently edit the application. The method may include silently editing the application. The method may include ending the silently editing of the application. The method may include sending the edits to the visitor, wherein the visitor cannot see the changes that are made to the application during the silently editing.

The application may be configured to provide a program to enable the operator and the visitor to collaborate.

The method may include selecting a hold button. The hold button may place the application in a hold state and return the visitor and operator to the previous co-browsing session. The method may include pushing the application to the visitor. The method may include co-browsing the application with the visitor.

Some disclosed embodiments provide a computer system for pushing applications to a website visitor during co-browsing. The computer system may include one or more input output devices configured to communicate over a communications network. The computer system may include one or more memory systems configured to store and retrieve data. The computer system may include one or more processors. The one or more processors may be configured to: initiate a co-browsing session between an operator and a visitor, and select an application to push to the visitor. The one or more processors may be configured to configure the application, push the application to the visitor, and co-browse the application with the visitor.

The one or more processors may be configured to configure the application by selecting content from webservers over the Internet. The content from the webservers may be received through a content provider layer and then through the one or more input output devices configured to communicate over a communications network.

The application may be configured to provide the visitor with at least one from the following group: the ability to upload a photograph, the ability to record the co-browsing session, and the ability to invite a friend to join the co-browsing session.

The one or more processors may be configured to receive an indication from the operator to select to silently edit the application, silently edit the application, receive an indication from the operator to end the silent edit of the application, and send the edits to the visitor, wherein the visitor cannot see the changes that are made to the application during the silently editing.

The application may be configured to provide a program to enable the operator and the visitor to collaborate.

The one or more processors may be configured to place the application in a hold state and return the visitor and operator to the previous co-browsing session in response to receiving an indication from the operator to select a hold button.

Some embodiments provide a computer readable non-transitory medium including instructions which when executed in a processing system cause the processing system to execute a method for multiple-tab co-browsing.

BRIEF DESCRIPTION OF THE DRAWINGS

A more detailed understanding may be had from the following description, given by way of example in conjunction with the accompanying drawings wherein.

DETAILED DESCRIPTION OF EMBODIMENT(S)

Figure 1:
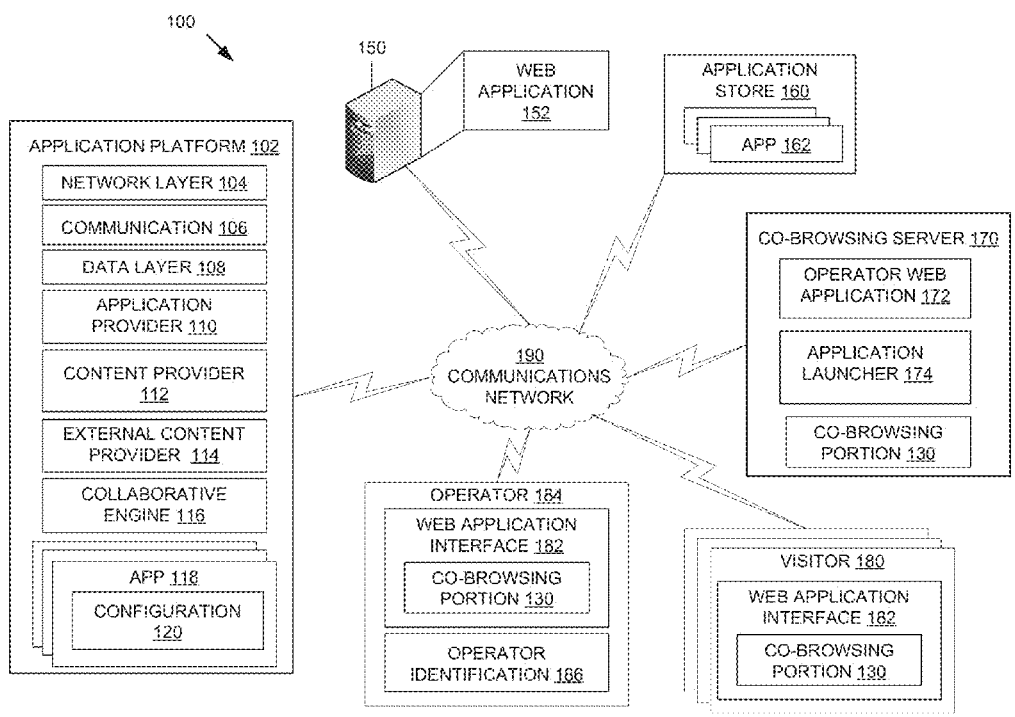
FIG. 1 schematically illustrates a system for co-browsing, which may include multi-tab co-browsing.

FIG. 1 schematically illustrates a system for pushing applications to a website visitor during co-browsing 100. The system 100 includes an application platform 102, custom website 150, application store 160, co-browsing server 170, visitor 180, operator 184, and communication network 190. The operator 184 may push an app 118 to a visitor 180 while the visitor 180 is consuming content from web application 152 and the operator 184 and the visitor 180 are co-browsing the web application 152.

The application platform 102 includes network layer 104, communication 106, data layer 108, application provider 110, content provider 112, external content provider 114, collaborative engine 116, and app 118.

The network layer 104 may be a network layer configured to handle the connectivity. For example, the network layer 104 may be configured to establish connections, establish concurrent users, and to establish reconnections. The network layer 104 may be a layer that is a lowest level in the architecture of the application platform 102. The network layer 104 may interact with the communication 106. The network layer 104 may be configured to perform messaging, routing and forwarding. The network layer 104 may be configured to perform soft real time responses. The network layer 104 may be configured to communicate using, for example, procedure calls, web sockets communications, and/or webRTCs.

The communication 106 may be a layer above the network layer 104. Communication 106 may add meaning to messages exchanged among different participants such as an app 118 and a visitor 180. For example, handshake messages to exchange basic information, chat messages, control messages, etc. The communication 106 may be extended by adding custom events, messages, and/or message handlers.

The data layer 108 may be a layer that handles interactions with the different data sources. The data layer 108 may be in charge of retrieving, filtering, inserting and modifying data for different data sources (not illustrated) in the system 100. The data layer 108 may be a data layer configured to provide a set of wrappers (not illustrated.) The set of wrappers may simplify the development of apps 118 that require accessing data from different types of data sources. Example of data sources includes RDBMS, NoSQL databases, S3, etc. The data layer 108 may be configured to encapsulate accessing data sources. The data sources may be local or accessed across the communication network 190. The set of wrappers may hide the complexity of dealing with different application program interfaces (APIs) from different sources. For example, an app 118 may be configured to retrieve information from Google® storage, DropBox®, or a custom data source using a wrapper that may reduce the complexity of accessing the data source. An example of a custom data source is a database hosted in a data source across the communications network 190. The wrapper may enable the app 118 to access the different sources of data by using a common interface provided by the wrapper of the data layer 108. The access to the data source provided by the wrapper to the app 118 may include data retrieval, data storage, and/or data creation.

The data layer 108 may be configured to store data retrieved in a database associated with the application platform 102. For instance, data retrieved from Google® Storage may be stored in a database associated with the application platform 102. The data layer 108 may be configured to synchronize data from different data sources based on standards such as SyncML and Funambol.

The application provider 110 may be configured to manage descriptors of apps 118. An app 118 that is available may have a descriptor stored associated with the application platform 102. The descriptor may include information about how the app 118 behaves and how the app 118 may be served to the visitor 180 and/or operator 184. The application provider 110 may be configured to manage the descriptors and process them in order to serve a specific app 118. For example, an app 118 may be developed using ExtJS, and the corresponding application descriptor may contain information such as folders, configuration files, index file, resources, endpoints, version of the application, etc. The app 118 may include extensions and/or Java® for extending the functionality of the app 118. The corresponding application descriptor may include the extensions/applets etc.

Content provider 112 may manage access to a structured set of data. A content provider 112 may be a standard interface that connects data with programming code running in another process or service. For example, an app 118 that needs to connect to an analytical API to get the number of visits per website by page can retrieve such data by creating a content provider 112 passing the parameters needed to connect to such API. As another example, an app 118 may need to connect to an external database to get product information for display to the visitor 180. The app 118 can retrieve such data by creating a content provider 112 and passing the parameters needed to connect to the external database to the content provider 112. The content provider 112 may have direct interaction with the data layer 108 and network layer 104 to retrieve and send data.

External Content Provider 114 may be configured to interact with apps 118 that communicate with external APIs, services or external data sources. Examples of services that may have external API, services or external data sources are Facebook®, Google®, Twitter®, Funambol®, etc. External content provider 114 may be configured to enables a developer to access and embed a web application into the application platform 102. An example of a web application may be an application that retrieves events from the Google® Calendar of the visitor 180. An external content provider 114 may be created to access the Google® Calendar of the visitor 180. The external content provider 114 may then be used by the app 118 to access the Google® calendar of the visitor 180. An external content provider 114 may be configured to push and create data in the external content provider. For example, an app 118 may use an external content provider 114 to retrieve the calendar events of the visitor 180 and determine to create a new event, and then the app 118 may use the external content provider 114 to create the new event in Google® calendar. The external content provider 114 may have direct interaction with the network layer 104, the communication 106, and the data layer 108, to retrieve and send data.

The collaborative engine 116 may be an engine for collaboration and mashing up content. The collaborative engine 116 may be configured to enable apps 118 to interact with other apps 118 or content in real time. For example, the collaborative engine 116 may enable an app 118 to access content, edit content, and share content in real time with another app 118 or web application 152. The content may include web content (co-browsing), media files such as pictures and video, documents (pdf files, excel sheet, presentations, etc.), SM applications, content from devices and embedded devices (such as camera, GPS, or screen), information (location, context, preferences, etc.), etc.

The apps 118 may be configured to push a program, content, or functionality to a visitor 180 that is co-browsing the web application 152 with the operator 184. In some embodiments, the visitor 180 and operator 184 may not be co-browsing the web application 152 at the time an app 118 is used by the operator 184 to push a program, content, or functionality to a visitor 180. The apps 118 may include configuration 120. The configuration 120 may include configuration 120 use restrictions of an app 118. For example, the configuration 120 may include a list of operators 184 with permission to run the application 184. The configuration 120 may include parameters and set-up information for the app 118.

In some embodiments, the apps 118 may include the following states configure, pushed, held, allocating, silent edit, and setting. The configure state may be a state before the operator 184 pushes the app 118 to the visitor 180. The app 118 may be configured to display the desired content or function. In the configure state the app 118 may only be visible to the operator 184 who can make the desired modifications to the app 184. Once the app 118 has been configured, the operator 184 may push the app 118 to the visitor 180.

The pushed state may be a state where the app 118 has been pushed to the visitor 180 by the operator 184. Once the app 118 is pushed to the visitor 180, the app 118 may be visible to the visitor 180. Once the app 118 is pushed, the push button may substituted with a pull button which may be selected to return the app 118 to the configure state where it may be visible only to the operator 184.

The held state may be a state where the operator 184 has placed the app 118 in the held state so the app 118 may be suspended and then brought back again. In some embodiments, the app 118 is minimized when the app 118 enters the held state. The operator 184 may then toggle between different apps 118, the pushed app 118 may be moved to a held state where it is not visible to a visitor 180 but retains the configuration originally set by the operator 184, or the last configuration that the operator 184 and the visitor 180 set for the app 118. Multiple apps 118 may remain in the held state and the operator 184 can toggle between them using the application launcher 174.

The allocating state may be a state where an app 118 is purchased by an operator 184 that is designated as a manager, and the app 118 is placed in an allocating state until the manager decides which operators 184 will have access to the app 118 as well as other permissions for the app 118.

The silent edit state is a state that an app 118 in the pushed state may enter. In the silent edit state the operator 184 may change the configuration for the app 118 in some way without the visitor 180 seeing those changes take place on the visitor 180 end until the app 118 returns to the pushed state.

The setting state is a state that an app 118 may be in to define settings and default behaviors for the app 118. The operator 184 can launch an app 118 in setting state to change these defaults settings and default behaviors to fit their preferences.

In some embodiments, the apps 118 may include program apps 118, content apps 118, and functionality apps 118. The program apps 118 may enable the operator 184 and visitor 180 to collaborate together through a program. Example programs include a whiteboard app 118 that may be used to illustrate financing for an automobile sale, a calculator app 118 that may be used to determine a real estate broker fee, and a furniture builder that may be used to collaborate on the details of a custom dresser.

The content apps 118 may enable the operator 184 to present content to the visitor 180 and/or enable the visitor 180 to present content to the operator 184. Examples of content include a frequently asked question (FAQ) presenter app 118 that may be viewed by the operator 184 and the visitor 180 together, a file view app 118 that enables the operator 184 and/or the visitor 180 to present a file which may be a Portable Document Format (PDF) file, power point file, or another type of file to view. In some embodiments, the file may be an audio or video file.

The functionality apps 118 may enable the operator 184 to provide the visitor 180 with additional functionality. Example functionality includes the ability of the visitor 180 to conduct a full screen sharing session, a function to enable a visitor 180 to invite a friend to join the co-browsing with the operator 184, a function to enable the visitor 180 to record the web-browsing session, and a functionality to enable the visitor to store portions of the interaction with the operator 184 such as the audio, text, and/or video with the operator 184.

The custom website 150 may be a website running on a webserver accessible over the Internet that offers information, goods, and/or services to visitors. The custom website 150 may include the web application 152. Some examples of the web application 152 include a website of an automobile manufacture, an automotive dealer, a watch manufacturer, an educational website, a website of a local library, a website of a broadcasting company or a website providing goods/services. In some embodiments, the web application 152 may offer goods, services, or information, all of which may be for sale. The application platform 102, operator 184, visitor 180, and/or co-browsing server 170 may make requests (not illustrated) to the web application 152 and receive response from the web application 152.

The application store 160 may be configured to store apps 162 available for free or for sale. The apps 162 may be for use with the co-browsing server 170. The application store 160 may require the approval of a manager to purchase an app 162.

The co-browsing server 170 may be a server 170. In some embodiments, the co-browsing server 170 may be a remote procedure call (RPC) server 170. The co-browsing server 170 may be more than one server. The functions described in relation to the co-browsing server 170 may be provided by one or more co-browsing servers 170. In some embodiments, operator 184 and visitor 180 may send some or all of the webpage updates (not illustrated) and user interface events (not illustrated) directly to one another.

The co-browsing server 170 may include operator web application 172, application launcher 174, and co-browsing portion 130. The co-browsing server 170 may be a computer server. The operator web application 172 may be an application to assist one or more operators 184 co-browse with one or more visitors 180. The application launcher 174 may be configured to operate with the operator web application 172 to launch apps 118. The application launcher 174 may be configured to enable the operator 184 to view apps 118 that are purchased and/or installed. The application launcher 174 may be configured to enable the operator 184 to switch between apps 118. The application launcher 174 may be configured to enable an operator 184 and/or a manager to remove, add, and/or configure apps 118. The manager may be an operator 184 with security permissions to restrict some operations on the apps 118. For example, the manager may be able to select which operators 184 may be able to perform an operation such as run an app 118.

Operator 184 and visitor 180 may be computing devices. Operator 184 and visitor 180 may include web application interface 182. The web application interface 182 may access a web application 152 where operator 184 and visitor 180 co-browse. For example, the web application interface 182 may be Internet Explorer® (IE) or Chrome®. The web application interface 182 may render webpage data (not illustrated) in order to present webpage data to the user. The web application interface 182 may include co-browsing portion 130. The co-browsing portion 130 may be configured to enable the co-browsing. The operator 184 may include the operator identification 186 which may be an identification of the operator 184. The visitor 180 may include a visitor identification (not illustrated).

Operator 184 may be a peer to visitor 180 or may have a master slave relationship. Operator 184 and visitor 180 may be on separate computing devices or on a same computing device. Operator 184 may be running the operator web application 172.

A person (not illustrated) may be a user of operator 184 or visitor 180. There may be more than one operator 184 and more than one visitor 180. In some embodiments, operator 184 and/or visitor 180 may include an automation module (not illustrated) that may generate events (not illustrated). For example, in some embodiments, an operator module may be included that co-browses with the visitor.

The communications network 190 may be one or more networks including the Internet, wireless local area networks, private networks, etc.

The application platform 102, custom website 150, application store 160, co-browsing server 170, visitor 180, and operator 184 may each run on a separate computing device, or two or more may run on the same computing device.

Figure 2:
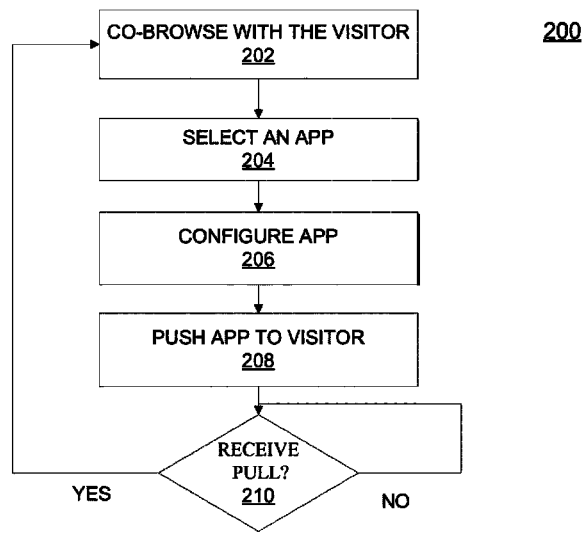
FIG. 2 illustrates an example method for pushing applications to a website visitor during co-browsing.

FIG. 2 illustrates an example method 200 for pushing applications to a website visitor during co-browsing. FIG. 2 will be discussed in conjunction with FIGS. 3 through 11.

The method 200 may begin with co-browsing with the visitor 202. An example of beginning co-browsing with the visitor will be presented in FIGS. 3 through FIG. 6. The example begins with FIG. 3A which illustrates a visitor 180 displaying a webpage 250. The webpage 250 may include navigation controls 252, a universal resource locator 254, and webpage content 256. The web application interface 182 of the visitor 180 may have retrieved the webpage 250 from the web application 152. The co-browsing portion 130 of visitor 180 may have been included in the webpage 250 retrieved from the web application 152 so that the visitor 180 communicates events such as mouse clicks to the co-browsing server 170.

Figure 3A:
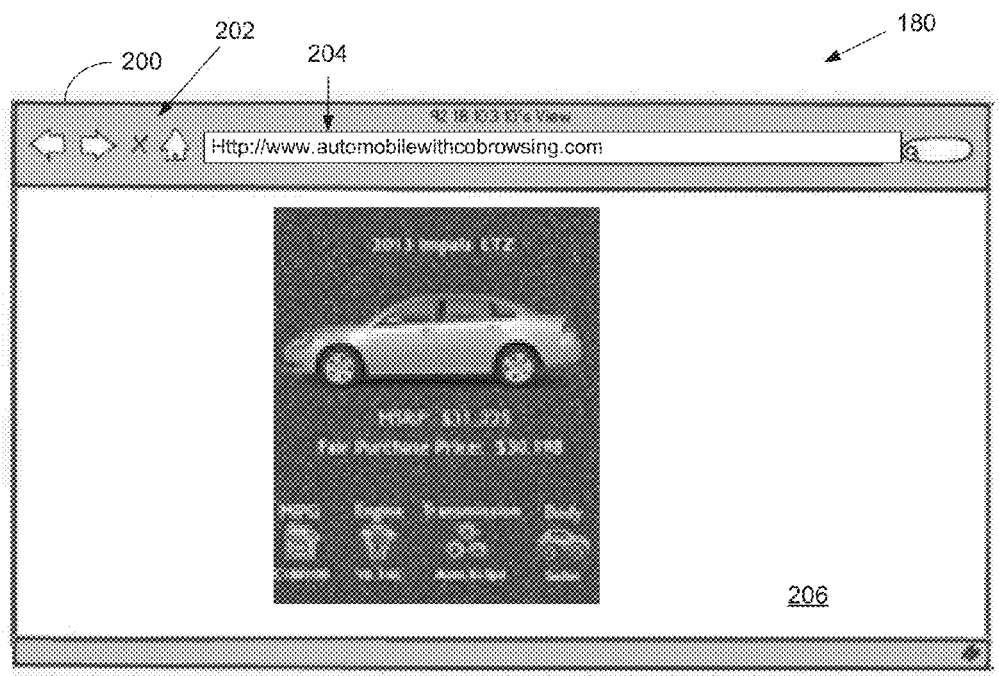
FIG. 3A illustrates a visitor displaying a webpage.
Figure 3B:
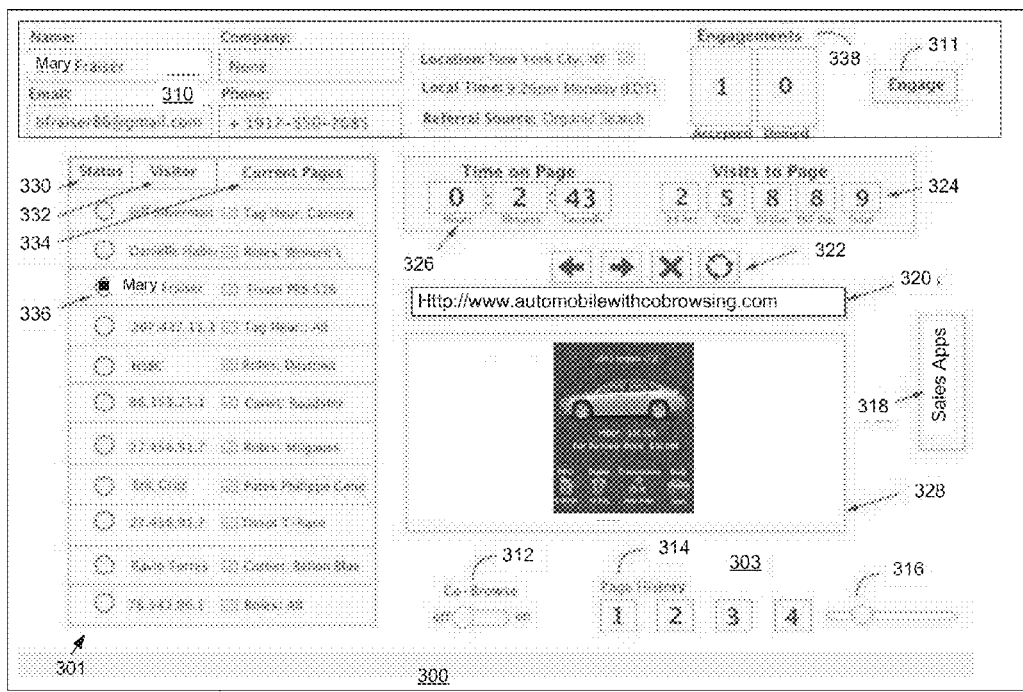
FIG. 3B illustrates an operator displaying a web page generated by a web application interface.

FIG. 3B illustrates operator 184 displaying a web page 300 generated by web application interface 182 such as Internet Explorer® or Google Chrome. The web application interface 182 of the operator 184 is accessing the operator web application 172. The operator 184 in FIG. 3B has selected the visitor 180 of FIG. 2 to observe the activity of the visitor 180. The webpage 256 of FIG. 2 is being observed at 328.

FIG. 3B includes a visitor list 301, selected visitor information 310, a webpage control area 303, and a sales apps button 318. The visitor list 301 is a list of the visitors to the web application 152. The visitor list 301 may include information regarding the visitors. Each of the visitors may be one of the visitors 180 illustrated in FIG. 1. The information regarding the visitors may include status 330, visitor 332, and current page 334. The status 330 may indicate a current status 336. The current status 336 may be indicated by a color. For example, blue may indicate that visitor 332 has accepted a co-browsing request, green may indicate that visitor 332 is available to co-browse; yellow may indicate that the visitor 332 has timed-out on a co-browsing request and, red may indicate that the visitor 332 has declined a co-browsing request. In some embodiments, the status 330 may indicate whether the visitor 332 is available for co-browsing or a likely candidate for co-browsing based on profiling the visitor 332 for likelihood of making a purchase. In some embodiments, the status 330 may indicate whether or not the visitor is co-browsing with another operator 184. In some embodiments, selecting engagements 338 will provide a list of the operators that have engaged the visitor 180. A visitor 180 may be a selected visitor 336. In some embodiments, additional information may be provided regarding the visitors 332. For example, a number of tabs that are currently opened for the web application 152 may be included for each of the visitors.

Information 310 of the selected visitor 336 may be provided by the operator web application 172. For example, the information 310 may include name, email, company, phone, location, referral source, and engagements 338. The selected visitor's name is Mary Fraiser. The engagements 338 may be a number of accepted co-browsing engagements, illustrated as "1", and a number of rejected co-browsing engagements, illustrated as "0" or other engagement result.

The webpage control area 303 may include a time on page 326, a visits to page 324, webpage controls 322, the webpage address 320 of the co-browsed webpage 328, a co-browse button 312, a page history 314, and a page history slider 316.

The time on the page 326 may indicate the number of hours, minutes, and seconds the selected visitor 336 has been on the co-browsed webpage 328. The visits to page 324 may indicate the number of times the selected visitor 336 has visited the co-browsed page 328. For example, the visits to page 324 may indicate a number of times in the last 24 hour, illustrated as "2", a number of times visited in the last 7 days, illustrated as "5", a number of times in the last 30 days, illustrated as "8", a number of times visited in the last 365 days, illustrated as "8", and a number of times visited overall, illustrated as "9."

The webpage controls 322 may control the co-browsed webpage 328 when co-browsing is turned on. The left arrow may go back a page in the browsing history, the right arrow may go forward a page in the browsing history, "X" may stop the loading of a webpage, and the circular arrows may reload the webpage. The co-browsed webpage 328 may be the same webpage 206 as visitor 180 is viewing (see FIG. 2). The co-browse button 312 may turn co-browsing on and off. In the on mode, events taken by visitor 180 will be mirrored in operator 184. In the off mode, operator 184 observes visitor 180.

The page history 314 displays where the co-browsed webpage 328 fits into the page history 314. Operator 184 may select a different page in the page history 314 and during co-browsing the selected page in the page history 314 will be displayed as the co-browsed webpage 328. The page history slider 316 may be used to access different pages in the page history 314. In some embodiments, the page slider 316 may be used to access different pages in the page history while observing the visitor 180.

The sales apps 318 may be a button to access sales apps 118 for operator 184 to use to further the interaction with the selected visitor 180.

Figure 4:
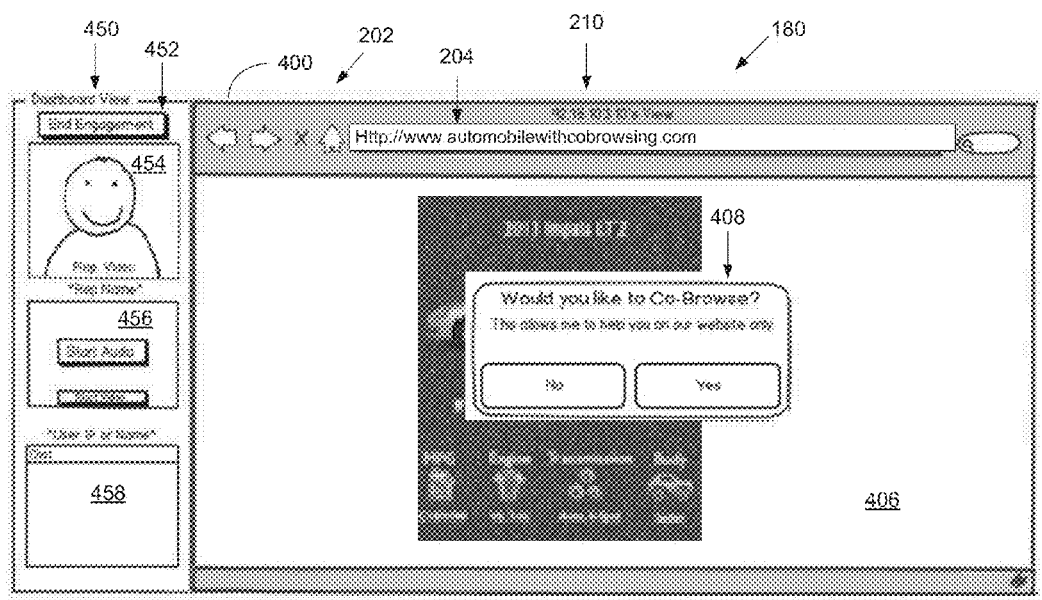
FIG. 4 illustrates a request from the operator of FIG. 3B to the visitor of FIG. 2 to permit the operator to co-browse with the visitor.

FIG. 4 illustrates a request from the operator 184 of FIG. 3B to the visitor 180 of FIG. 2 to permit the operator 184 to co-browse with the visitor 180. The request from the operator 184 may have been generated by the operator 184 selecting engage 311 (FIG. 3B). In some embodiments, the operator web application 172 may have generated the user interface screen 400.

Illustrated in FIG. 4 are two main areas of the user interface screen 400 a communication area 450, and the current webpage 260 of the visitor 180. As illustrated, the visitor 180 is being requested to co-browse with the operator 184, in a dialogue box 408. The current webpage 260 may include the universal resource locator 254. The communication area 450 may include a rep video 454, which may be a live video of the operator 184. An area 456 for video or starting audio of the visitor 180. And, an area 458 for typing and receiving text.

Figure 5:
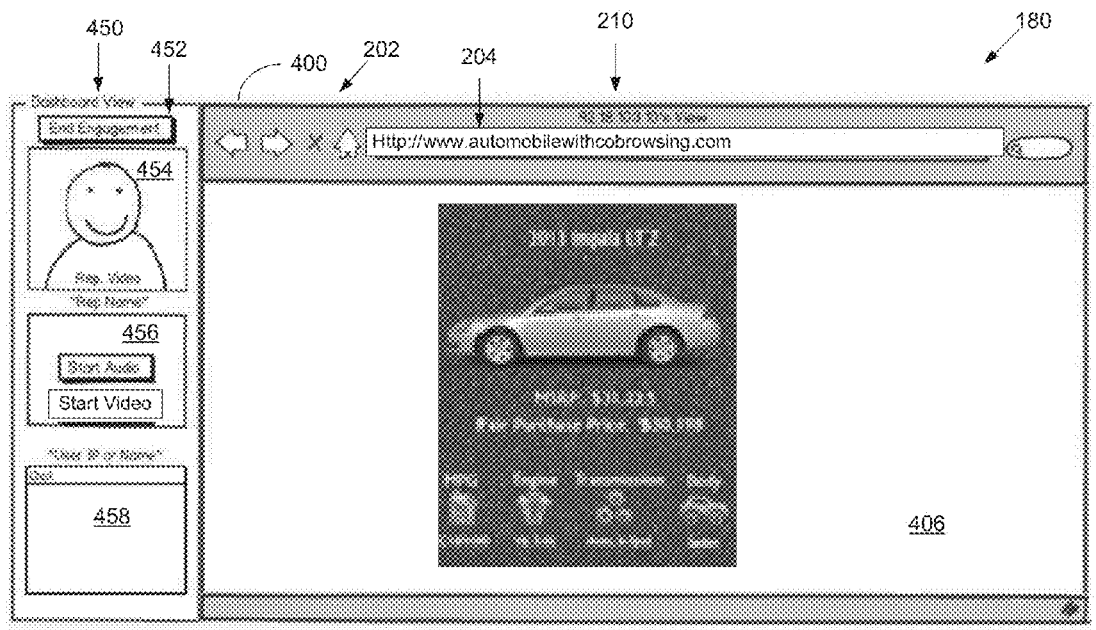
FIG. 5 illustrates the result of the visitor having accepted the invitation to co-browse offered in FIG. 4.
Figure 6:
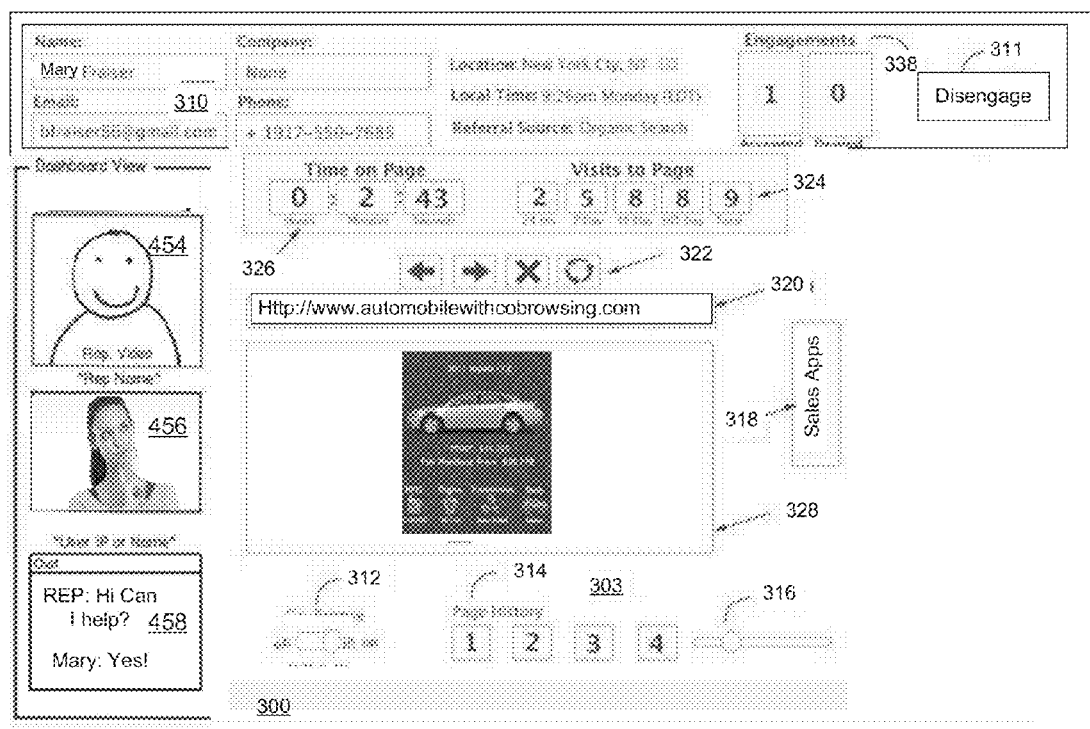
FIG. 6 illustrates operator after the visitor accepted the invitation to co-browse that was extended by the operator selecting engage in FIG. 3B.

FIG. 5 illustrates the result of the visitor 180 having accepted the invitation to co-browse 408 offered in FIG. 4. FIG. 6 illustrates operator 184 after the visitor 180 accepted the invitation to co-browse 408 that was extended by the operator 184 selecting engage 311 in FIG. 3B. Illustrated in FIG. 6 is the co-browsing button 312 now indicating that the operator 184 and the visitor 180 are co-browsing. The engage button 311 is now a disengage button 311. And, the visitor 180 in FIG. 5 has selected "start video" in area 456 so that the video of Mary Fraiser is visible in area 456. As illustrated, the Rep: has typed in "Hi. Can I help?" in area 458 and visitor 180, Mary Fraiser, has typed in "Yes!"

The example of co-browse with the visitor 202 is complete. So, the method 200 may continue with selecting an app 204.

Figure 7:
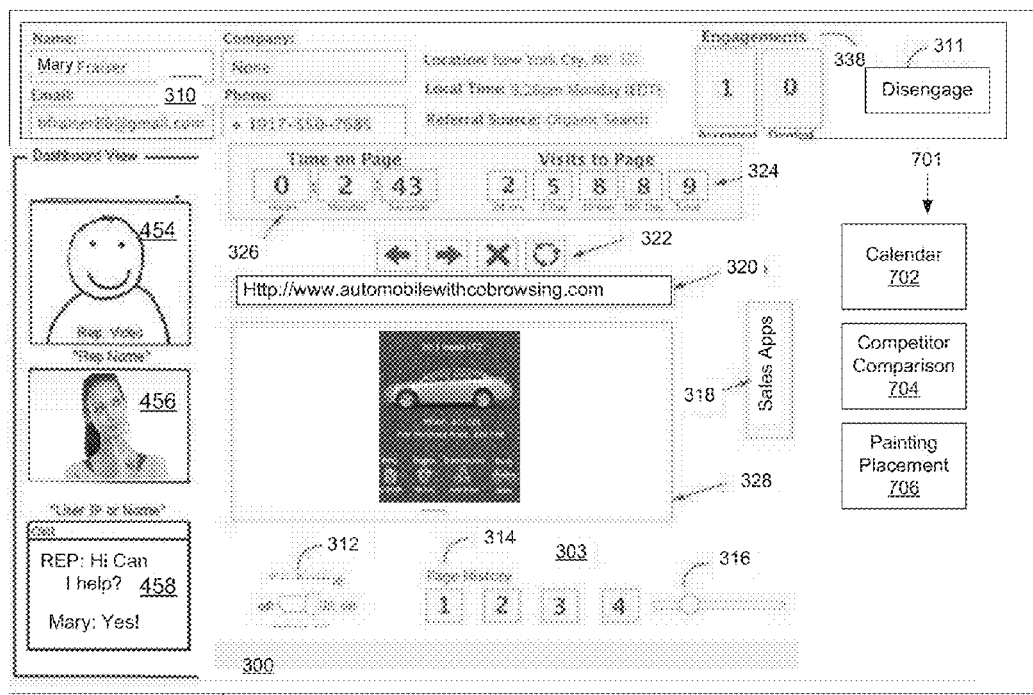
FIG. 7 illustrates the operator after the operator selected the sales apps button in FIG. 6.
Figure 8:
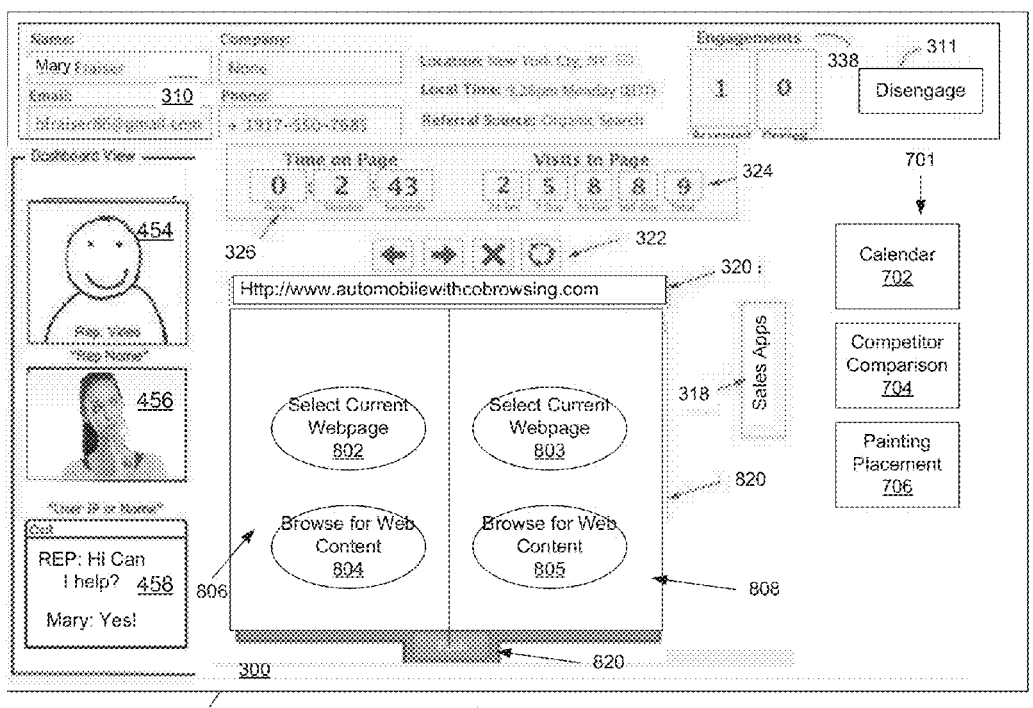
FIG. 8 illustrates an example interface after the operator selects the competitor comparison app.

For example, FIG. 7 illustrates the operator 184 after the operator 184 selected the sales apps 318 button in FIG. 6. A list of available sales apps 701 is displayed. The available sales apps 701 include calendar 702, competitor comparison 704, and painting placement 706. The operator 184 may select the competitor comparison app 704.

The method 200 may continue with configuring the app 206. For example, after the operator 184 selects the competitor comparison app 704 the operator 184 may be presented with the interface displayed in FIG. 8. The competitive comparison app 704 may display a configuration interface 820. The configuration interface 820 includes a left side 806, right side 808, and a push button 820. The left side 806 includes a select current webpage 802 and browse for web content 804. The right side includes select current webpage 803 and browse for web content 805. The operator 184 may select the select current webpage 802 for the left side 806. The operator 184 may browse for a competitor that the visitor 180 is interested in and retrieve a page that has comparison information for the competitor. The operator 184 may discuss a competitor with the visitor 180 using the video chat 454, 456 and/or the chat 458. The right side 808 may be a webpage from a website accessible over the Internet.

Figure 9:
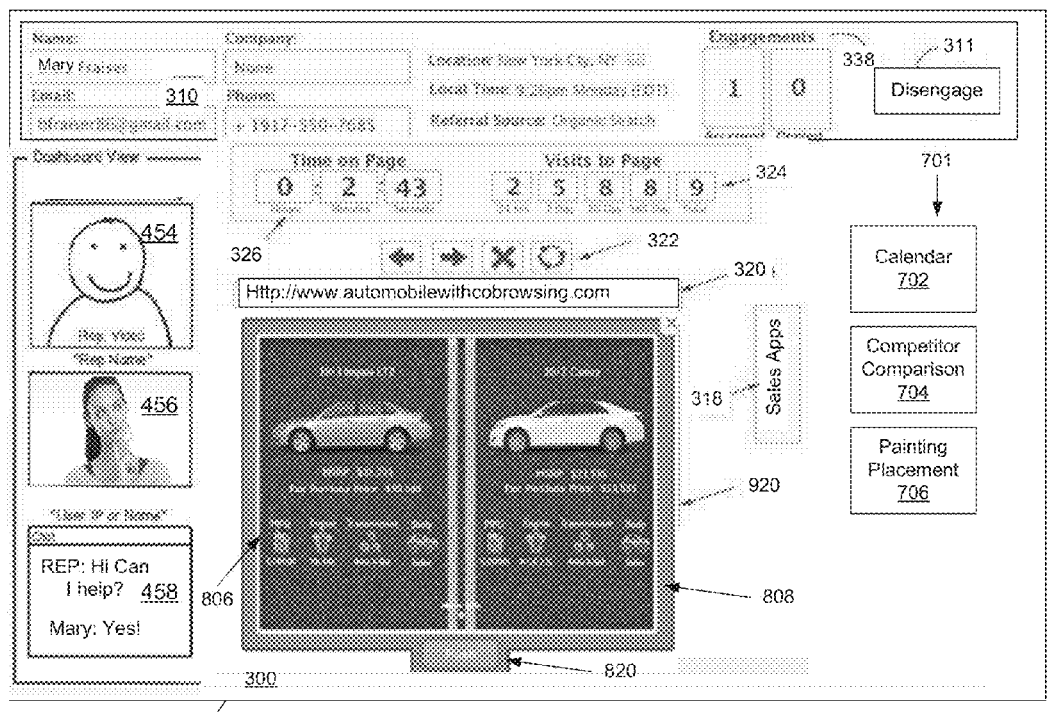
FIG. 9 illustrates an example after the operator has configured the competitor comparison app.

FIG. 9 illustrates an example after the operator 184 has configured the competitor comparison app 704. The configuration interface 820 is now configured into the interface 920 for comparing two automobiles according to the app competitive comparison 704. The left side 806 is the automobile the visitor 180 was browsing and the right side 808 is a webpage from the Internet with information for a competitive automobile the visitor 180 was interested in.

Figure 10:
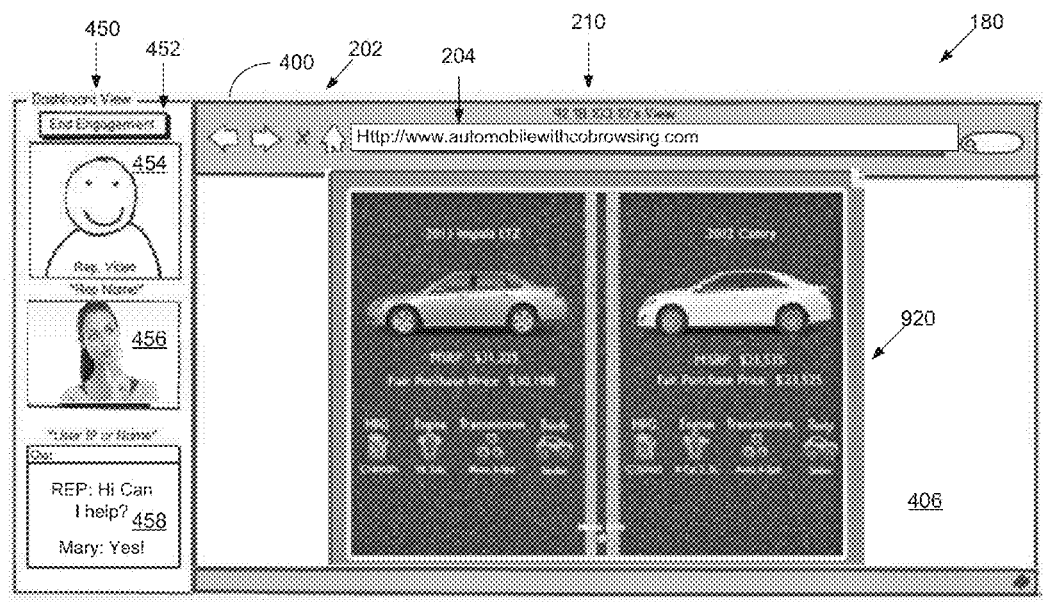
FIG. 10 illustrates the visitor with the interface of the competitive comparison app being displayed to the visitor.

The method 200 may continue with pushing the app to the visitor 180. For example, the operator 184 may click the push button 820 in FIG. 9. The interface 920 is pushed to the visitor 180 so that the operator 180 and the visitor 184 may co-browse the interface 920. FIG. 10 illustrates the visitor 180 with the interface 920 of the competitive comparison app 704 being displayed to the visitor 180.

Figure 11:
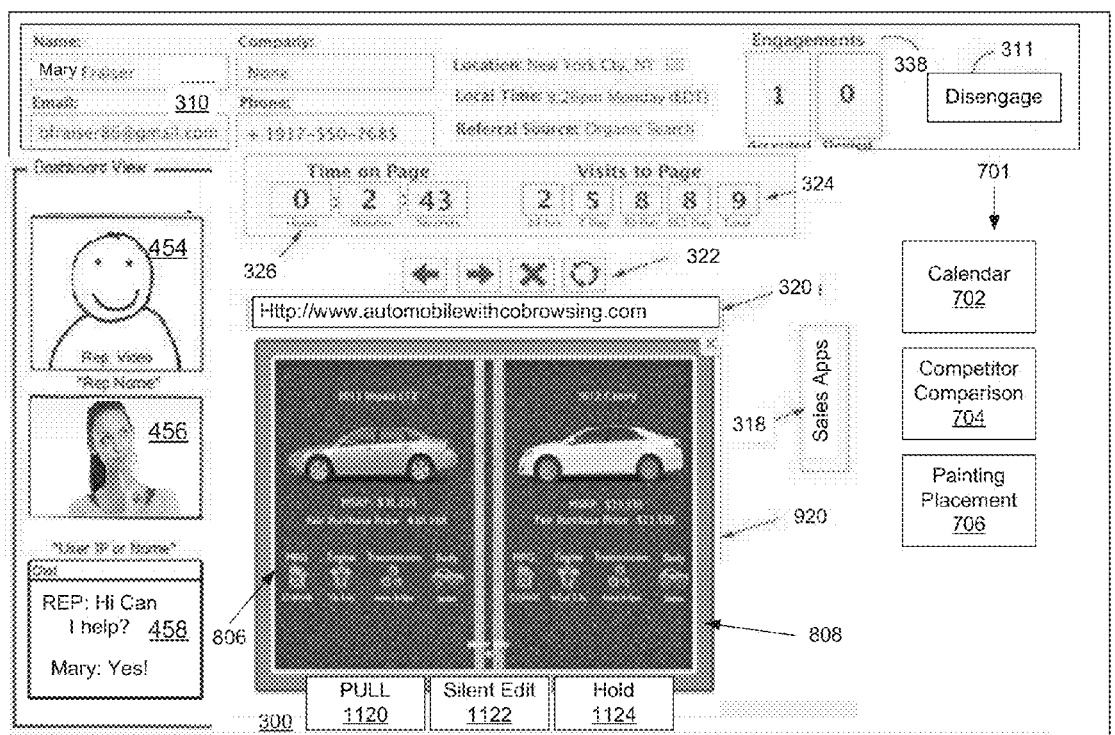
FIG. 11 illustrates the operator after the operator pressed the push button in FIG. 9.

FIG. 11 illustrates the operator 184 after the operator pressed the push button 920 in FIG. 9. Illustrated in FIG. 11 is a pull button 1120, silent edit button 1122, and hold button 1124. The silent edit button 1122 enables the operator 184 to change the configuration of the competitor comparison app 704 without the visitor 180 observing the operator 184 make the changes to the configuration. For example, the operator 184 could press silent edit 1122 and select a new automobile for the right side 808 and then push the new interface 920 to the visitor 180. The hold button 1124 enables the operator 184 to place the app 118 in a holding or minimized state where it can be pushed again without having to be re-configured. In some embodiments, a different app 118 may be pushed to the visitor 180 after the current app 118 is minimized.

The method 200 may continue with receive pull 210. For example, the operator 184 may press pull 1120 in FIG. 11 and the interface 920 would return to the interface of FIG. 7.

Figure 12:
FIG. 12 illustrates an example of the painting placement app being used during co-browsing between an operator and a visitor.

FIG. 12 illustrates an example of the painting placement app 706 being used during co-browsing between an operator 184 and a visitor 180. Illustrated is a co-browsing session 1200 from the perspective of the visitor 180 with a picture 1204 of the living room of the visitor 180 uploaded into the painting placement app 764 with paintings 1206 for sale listed. A selected painting 1202 is then rendered in the picture 1204 of the living room of the visitor 180 so that the visitor 180 may see how the painting 1202 would look. The painting placement app 764 is an example of a program app 118 which enable the operator 180 and the visitor 184 to co-browse and collaborate together through a program.

Figure 13:
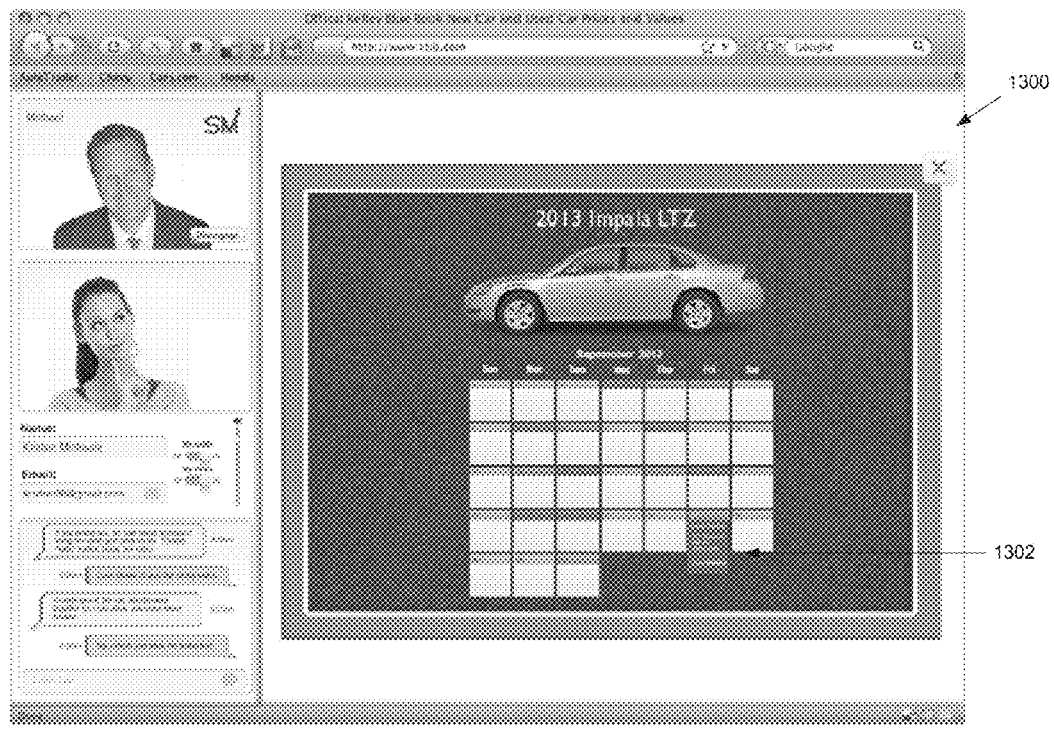
FIG. 13 illustrates an example of the calendar app being used during co-browsing between an operator and a visitor.

FIG. 13 illustrates an example of the calendar app 702 being used during co-browsing between an operator 184 and a visitor 180. Illustrated is a co-browsing session 1300 from the perspective of the visitor 180. The calendar app 762 enables an operator 184 and visitor 180 to coordinate a test-drive or in person meeting. The visitor 180 is provided with the additional functionality to export the calendar event to their personal or online calendar. The drop-down menu 1302 provides the options for the event to be exported to a calendar of the visitor 180.

The calendar app 702 is an example of a functionality apps 118 that enables the operator 184 to provide the visitor 180 with additional functionality within the interaction.

Figure 14:
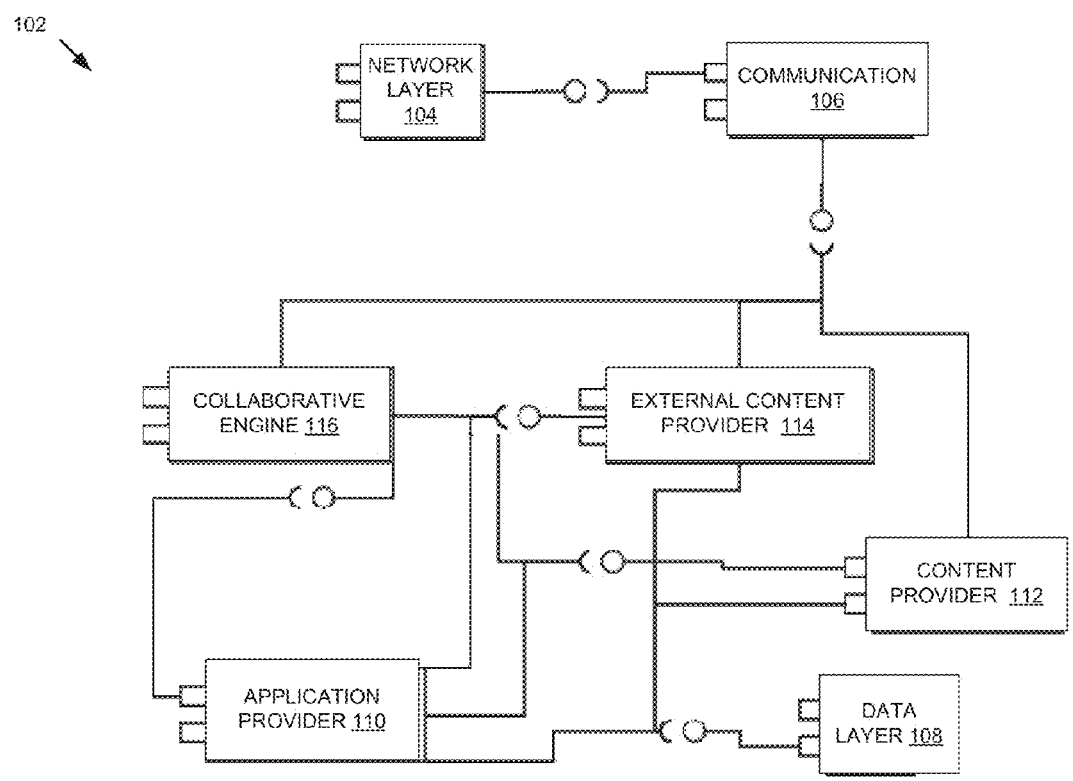
FIG. 14 illustrates an example of the application platform and methods and apparatuses associated with the application platform.

FIG. 14 illustrates an example of the application platform 102 and methods and apparatuses associated with the application platform 102. Illustrated in FIG. 14 are the network layer 104, communication 106, data layer 108, application provider 110, content provider 112, external content provider 114, collaborative engine 116, and app 118.

The competitor comparison app 704 enables the operator 184 to push dynamic content to the visitors 180. The operator 184 could select the specification for two cars from different websites or other sources. See FIG. 8 where the interface 820 enables a left side 806 selection of browse for web content 804 and a right side 808 selection of browse for web content 805. The operator 184 could select for the left side 806, for example, a "2013 Impala LTZ" where its information is pulled from www.manahatanauto.com, and the operator 184 could select for the right side a "2012 Camry" where its information is pulled from www.autobytel.com.

When the operator 184 clicks on the competitor comparison app 704, the click event is handled by the application launcher 174 (see FIG. 1), which may run in the web application interface 182 of the operator 184. The application launcher 174 handles the click event and captures the name of the competitor comparison app 704, the operator identification 186, and information from the context that might be required for further customizations to the competitor comparison app 704. For example, the context may include location and performance information that may be used by the application launcher 174 to select a server to serve the competitive comparison app 704.

The application launcher 174 makes a request to the application provider 110. The application provider 110 receives the request and determines whether or not the competitor comparison app 704 has been served before and if it exists in the cache (not illustrated) of the application provider 110. The cache of the application provider 110 may maintain an instance of the latest applications 118 served. If the competitive comparison app 704 is in the cache it is served to the operator 184. If the competitive comparison app 704 is not in the cache the application provider 110 parses an application descriptor of the competitive comparison app 704 and gathers all the resources needed for the competitive comparison app 704.

The application provider 110 will create a session for the application launcher 174 of the operator 184 and stream the competitive comparison app 704 to the application launcher 174. The application provider 110 creates an entry in the cache of the application provider 110 with metadata of the competitive comparison app 704. When the application launcher 174 receives the stream of the competitive comparison app 704, the competitive comparison app 704 is rendered in an application area of a web-browser. For example, area 920 of FIG. 11 or area 1300 of FIG. 13. The competitive comparison app 704 received by the application launcher 174 may include an event handler (not illustrated) for handling events that might be sent/received by the competitive comparison app 704 to other components of the system 100.

The operator 184 may configure the apps 118. The operator 184 may configure the app 118 locally or might use interaction with another component such as content providers 112. A local configuration may occur when the visitor 180 changes local information in the app 118. The visitor 180 may change the configuration in the interface provided and the change may only have a local effect. Examples of local configuration changes include the operator 184 changing months in the calendar app 702 (see FIG. 13), and when the operator 184 selects a discount in a car service app (not illustrated) where the discount may affect other values in the car service app such as the taxes due.

The following is an example of a configuration that requires a call to the content provider 112. The competitive comparison app 704 may take the information of the automobile from an external website or database. In this case, the competitive comparison app 704 makes a request, which may be in a serializable format, to the application provider 110, which receives and parses the request and sends the request to the content provider 112, which may handle content request for both local or external content providers. The content provider 112 receives the request and invokes/gathers the service/content necessary. For example a call to the content provider 112 might retrieve all the calendar events of the operator 184 from different sources such as Funambol® or Google® Analytics. Some apps 118 support the sharing of local files such as PDF files, pictures or documents between the operator 184 and the visitor 180. In this case the operator 184 can upload the file to the session of the app 118 and the content may then be pushed to the one or more visitors 180 and/or operators 184 via content provider 112.

An app 118 may be configured to share the desktop of the visitor 180, play a game with the operator 184, or invite a friend to join the co-browsing session. For example, the operator 184 may push an app 118 that displays a Facebook® button that when selected pulls up the contacts of the visitor 180 enables the visitor 180 to choose a person from the contacts to join the co-browsing session.

Once the app 118 has been configured the operator 184 can push the app 118 to the visitor 180 by clicking the push button 820 (see FIG. 9) that by default is provided by all the apps 118. When the operator 184 pushes the app 118 to the visitor 180 a request is sent to the application provider 110 that may include the current states of the app 118 in a serializable format (such as JSON®), the information of the operator 184 and the information of the visitor 180, among other context information that can be used for optimizations. The application provider 110 passes the request to the collaborative engine 116, which creates a session for the app 118 containing the meta data of the app 118 (such as current state, etc.) and information from the visitor 180 and the operator 184. The collaboration engine 116 may interact with the communication layer 106 to forward the messages back and forth between the operator 184 and visitors 180. The collaboration engine 116 may synchronize the different events when the operator 184 and the visitor 180 collaboratively interact with the app 118. For example, in an app 118 that enables the collaborative browsing inside custom webpages, the collaborative engine 116 streams document object model (DOM) changes from the visitor 180 to the operator 184 and graphical user interface (GUI) events from the operator 184 to the visitor 180. In some embodiments, the collaborative engine 116 streams document object model (DOM) changes from the operator 184 to the visitor 180 and graphical user interface (GUI) events from the visitor 180 to the operator 184. In some embodiments, the collaborative engine 116 may dynamically determine whether to stream DOM changes from the operator 184 to the visitor 180 or from the visitor 180 to the operator 184 based on improving performance.

DOM-based collaborative browsing has been filed under application Ser. No. 13/940,802, entitled "CO-BROWSING BETWEEN ONE OR MORE OPERATORS AND ONE OR MORE VISITORS" and filed on Jul. 12, 2013, the entire contents of which are hereby incorporated by reference. Additionally, the entire contents of application Ser. No. 13/940,890 entitled "ENHANCED MULTI-TAB CO-BROWSING BETWEEN ONE OR MORE OPERATORS AND ONE OR MORE VISITORS," and filed on Jul. 12, 2013 are hereby incorporated by reference.

The communication layer 106 may modify the messages to add meaning to the messages that may be sent between the operator 184 and the visitor 180. The modifications may handle routing issues and may be based on business rules. The communication layer 106 sends the streamed app 118 to the visitor 180 through the network layer 104. When the message is received by the application launcher client of the visitor 180, it is rendered by the web application interface 182 in area for the app 118. The visitor 180 may collaboratively interact with the operator 184 over the app 118.

A state of the app 118 may be maintained by the collaboration engine 116 and can be saved at any point of time (e.g. configure, pushed, held, allocating, silent edit, and setting) to be resumed later by the operator 184. In addition, the operator 184 may pause the collaborative interaction with the visitor 180 without stopping/pushing the app 118, in this case the collaborative engine 116 stops streaming changes from the operator 184 to the visitor 180 but does not stop the app 118. If the silent edit is done by the operator 184 those configuration and/or changes are streamed to the visitor 180 and executed at the visitor 180 by the app 118.

If the operator 184 or the visitor 180 stops the app 118 a notification messages may be sent to other operators 184 and/or visitors 180 connected to the session that did not send the stop notification. In addition, the collaborative session may be removed by the collaborative engine 116 and the session of the app 118 may be removed by the application provider 110.

A development environment may be provided for the apps 118. The development environment may provide a framework that provides tools and libraries that allow developers to develop/debug/pack, publish app 162 to the distribution channel.

The development environment may include a publisher engine. The publisher engine may enable the packing of an app 118 and publishing of the app 118 into the system 100. Once the apps 162 are published they become available to customers or operators in the application store 160.

The development environment may include scripting languages. The application programming interface (API) may be written in a scripting language (e.g. Clojure, Javascript, Ceylon, etc) so it can be launched in the browser or the server. A set of libraries to interact with the different layers in the application platform 102 may be provided. Custom libraries/plugins may be added to enrich the existing repositories.

The development environment may include integration with Integrated Development Environments (IDEs). Each of the components of the development environment and the application platform 102 may be integrated with IDEs such as Eclipse®, Visual Studio® from Microsoft®, jBuilder®, etc. Plugins may be provided to integrate with the IDEs.

The development environment may include development and production endpoints. The development environment may be enabled to consume services such as analytics and/or video, so the developers can test/debug their apps 118 and access services as they would be accessed in production. For example, an app 118 that requires analytics information can retrieve such information from sm.development.analytics.com for testing/developing purposes and have an environment similar to the production environment. The app 118 once published may invoke the services from analytics.salemove.com (production end point for analytics) instead of development.salemove.com (development end point for analytics).

The development environment may include local prebuilt environments. Some services may be served locally or in private data centers (e.g. video or analytics). The development environment may provide a pre-built version of the services to be run locally in the developers computer for testing/development purposes or for service provisioning in private data centers in case the application requires services.

The development environment may include framework libraries for graphical elements. The libraries for graphical elements may keep the consistency among the different apps 118. The development environment may provide an API for building GUI elements (e.g buttons, labels, containers, panels, etc.). The GUI elements may be customized to fit the look and feel of the application but the developer may be limited in amount of change they can make so that the graphical elements fit the development environment brand.

The development environment may include an application evaluation policy. The application evaluation may insure that the apps 118 meet a level of quality of service. For example, the application evaluation may insure that the graphical elements have not been modified to not fit the development environment brand.

The development environment may include performance tools. The performance tools may provide to developers a way to test the apps 118 performance without running in a production mode. The performance tools may measure different performance metrics such as latency (loading times in scripts, images, etc.), size of data transmitted, processing time in the server, processing time in the user's browser, CPU utilization by the server, CPU utilization by the user's browser, bandwidth utilization, among others. The performance measures may be processed and quantity metrics may be shown to the developer via an interface.

The development environment may include developer accounts. The development accounts may enable developers to publish apps 118 and for developers to pay fees and receive compensation.

The development environment may include cloud middleware. Since apps 118 may integrate with cloud services, the development environment may provide a layer of abstraction that enables the apps 118 to invoke cloud services asynchronously and in a state-full fashion thus the apps' 118 states may remain. If an app 118 requires accessing different cloud services from different vendors and providers, the development environment may provide a unified interface of interaction to minimize overheads during the development and execution of the apps 118. For example, if a calendar app 118 requires access services such as Google Calendar®, Funambol® and storage services, then the calendar app 118 may be difficult for the developer to develop due to the many API from different vendors. The development environment may provide a unified interface for accessing different cloud services by taking care of the invocation and accessing of the services.

The development environment may include a collaborative framework. The collaborative framework may enhance an app's 118 functionality by adding collaborative capabilities. An app 118 may include sharing content from different sources such as, for example, local files, cloud services, embedded devices (cameras, sensors, etc.) and context information. This information may be presented, edited, and modified in real time by the visitor 180 or the operator 184 during the co-browsing session, and the changes are replicated in the other participants and may be replicated in the source of the data/information. For example, if a session has two participants who are collaborating on editing a Google Calendar® event, and the event has several documents attached to it. These document may be used during the scheduled meeting. Content modifications of the documents by participants may be synchronized to everybody else in the editing session. The modification may also be recorded to all related data sources (for example, Google Calendar®, Google Docs®, SaleMove™).

The development environment may include extendable communication protocol. The extendable communication protocol may be extended by developers. For example, a developer may add on top of the basic network layer 104 custom events/messages to be used in the app 118. In addition, a developer can create an extra layer that relies on the core communication protocol functionality provided by the framework. Alternatively, the developer can extend by means of inheritance the core communication protocol and add custom business logic.

The development environment may include application, deployment or other types of templates. Templates may provide a set of templates that can be extended to fit the needs of developers. New templates in JSON® format may be created and imported into the development environment.

Figure 15:
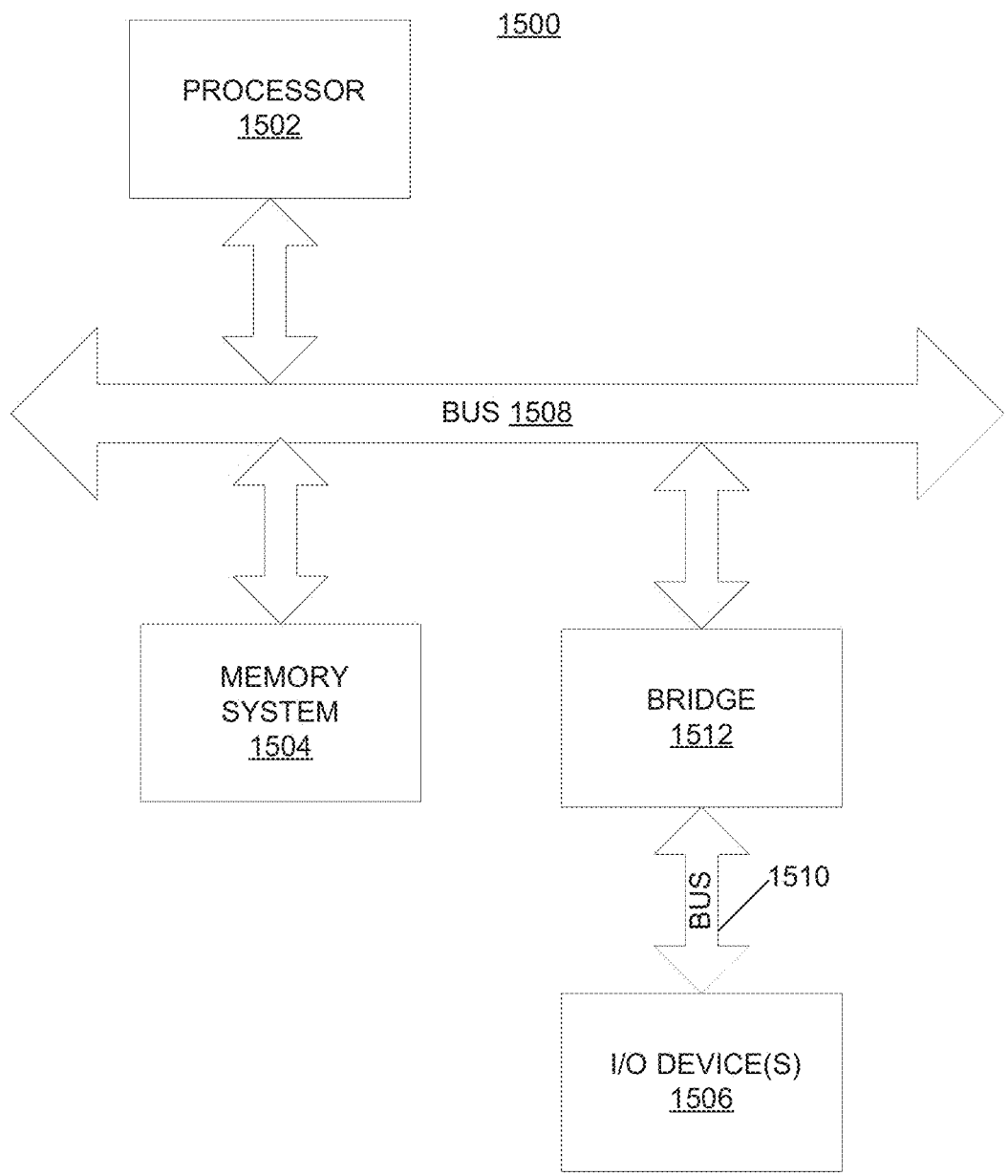
FIG. 15 is a simplified functional block diagram of a computer system.

FIG. 15 is a simplified functional block diagram of a computer system 1500. One or more of the co-browsing server 170, visitor 180, operator 184, application platform 102, custom website 150, web application 152, and application store 160 may be implemented by the computer system 1500 where portions of the co-browsing server 170, visitor 180, operator 184, application platform 102, custom website 150, web application 152, and application store 160 may be implemented in software, hardware, or firmware. In some embodiments, the functions of the co-browsing server 170, visitor 180, operator 184, application platform 102, custom website 150, web application 152, and application store 160 may be distributed across multiple computer systems 1500.

As illustrated in FIG. 15, the computer system 1500 includes one or more processors 1502, one or more memory systems 1504 and one or more input/output (I/O) devices 1506 in communication by two communication buses 1506, 1508, and a bridge 1512. The communication buses 1506, 1508 and bridge 1512 may be implemented in a variety of ways and may include one or more computer buses 1508, 1510 and/or bridge devices 1512 as shown in FIG. 15. The I/O devices 1506 can include network adapters and/or mass storage devices from which the computer system 1500 can receive data from one or more of the co-browsing server 170, visitor 180, operator 184, application platform 102, custom website 150, web application 152, and application store 160 for processing by the processor 1502 when the computer system 1500 operates as one or more of the co-browsing server 170, visitor 180, operator 184, application platform 102, custom website 150, web application 152, and application store 160.

The methods and apparatuses provided may be implemented in a general purpose computer, a processor, or a processor core. Suitable processors include, by way of example, a general purpose processor, a graphics processing unit (GPU), a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium is a non-transitory computer-readable storage medium. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for pushing applications to a website visitor during co-browsing, the method comprising:

initiating a co-browsing session between an operator and a visitor;
selecting an application to push to the visitor;
configuring the application;
pushing the application to the visitor;
co-browsing the application with the visitor;
selecting to edit the application;
editing the application, wherein the visitor cannot see changes that are made to the application during the editing of the application by the operator;
ending the editing of the application; and
sending the edits to the visitor.

2. The method of claim 1, wherein the application is only available to the website visitor by an operator of the website pushing the application to the website visitor.

3. The method of claim 1, wherein the configuring comprises:
configuring the application by selecting content from webservers over an Internet.

4. The method of claim 3, wherein the content from the webservers is received through a content provider layer.

5. The method of claim 1, wherein the application provides interactive functionality to the visitor for assisting in a sale to the visitor.

6. The method of claim 1, wherein the application is configured to enable the visitor with at least one from the following group: to upload a photograph, to record the co-browsing session, to play a game with the operator, to share a desktop of the visitor, to select a button that pulls up contacts of the visitor from a third party application that enables the visitor to invite a friend to join the co-browsing session, and to invite a friend via a text message or email to join the co-browsing session.

7. The method of claim 1, wherein the application is configured to provide a program to enable the operator and the visitor to collaborate.

8. The method of claim 1, further comprising:
selecting a hold button, wherein selecting the hold button places the application in a hold state and returns the visitor and operator to a previous co-browsing session;
pushing the application to the visitor; and
co-browsing the application with the visitor.

9. A computer system for pushing applications to a website visitor during co-browsing, the computer system comprising:
one or more input output devices configured to communicate over a communications network;
one or more memory systems configured to store and retrieve data; and
one or more processors, wherein the one or more processors are configured to:
initiate a co-browsing session between an operator and a visitor, in response to an indication from the operator to initiate a co-browsing session;
select an application to push to the visitor, in response to an indication from the operator of a selection of the application;
configure the application, in response to configuration selections from the operator;
push the application to the visitor, in response to an indication to push the application from the operator;
co-browse the application with the visitor, in response to browsing events received from the operator;
receive an indication from the operator to select to edit the application;
edit the application in response to an indication to edit the application from the operator, wherein the visitor cannot see changes that are made to the application during the editing of the application by the operator;

receive an indication from the operator to end the edit of the application; and send the edits to the visitor.

10. The computer system of claim 9, wherein the application is only available to the visitor by the operator pushing the application to the visitor.

11. The computer system of claim 9, wherein the one or more processor are further configured to:

configure the application from content from webservers over an Internet in response to a selection of the content from webservers over the Internet from the operator.

12. The computer system of claim 11, wherein the content from the webservers is received through a content provider layer and then through the one or more input output devices configured to communicate over the communications network.

13. The computer system of claim 9, wherein the application is configured to enable the visitor with at least one from the following group: to upload a photograph, to record the co-browsing, and to invite a friend via a text message or email to join the co-browsing.

14. The computer system of claim 9, wherein the application is configured to provide a program to enable the operator and the visitor to collaborate.

15. The computer system of claim 9, wherein the one or more processors are further configured to:

place the application in a hold state and return the visitor and operator to a previous co-browsing session in response to indication from the operator to enter the hold state;

push the application to the visitor in response to receiving an indication from the operator to push the application to the visitor; and co-browse the application with the visitor in response to browsing events received from the operator.

16. The computer system of claim 9, wherein the application is configured to provide interactive functionality to the visitor for assisting in a sale to the visitor.

* * * * *